(12) United States Patent
Kluhsman

(10) Patent No.: US 6,681,621 B1
(45) Date of Patent: Jan. 27, 2004

(54) APPARATUS FOR MEASURING RACE CAR TIRE STAGGER

(75) Inventor: Melvin L. Kluhsman, Lockwood, MO (US)

(73) Assignee: Kluhsman Machine, Inc., Lockwood, MO (US)

( * ) Notice: Subject to any disclaimer, the term of this patent is extended or adjusted under 35 U.S.C. 154(b) by 25 days.

(21) Appl. No.: 09/685,451

(22) Filed: Oct. 9, 2000

(51) Int. Cl.⁷ .............................................. G01M 17/02
(52) U.S. Cl. ........................................................ 73/146
(58) Field of Search ............................... 73/146–146.8, 73/618; 157/1, 1.1, 1.11

(56) References Cited

U.S. PATENT DOCUMENTS

| | | | | | |
|---|---|---|---|---|---|
| 4,742,859 A | * | 5/1988 | Mannen | .......................... | 157/1 |
| 4,840,215 A | * | 6/1989 | Vijay et al. | ...................... | 157/1 |
| 5,141,589 A | * | 8/1992 | Mittal | ......................... | 152/415 |

* cited by examiner

Primary Examiner—Ren Yan
Assistant Examiner—Marissa Ferguson
(74) Attorney, Agent, or Firm—Hovey Williams LLP

(57) ABSTRACT

A tire work device (10) specially designed to facilitate tire inspection and/or diameter measurement thereof in order to permit proper inflation of race car tires to achieve a desired degree of tire stagger, or the provision of tires of different effective diameters on opposite sides of the car, so that the car will perform better on a banked racetrack. The device (10) includes an upright standard (36) supporting a pair of opposed, relatively shiftable tire mounts (38, 40) and a stop (18) serving to set the limit of possible movement between the mounts (38, 40). An inflator (16) is also associated with the device (10), and permits selective inflation of a tire (14) mounted on the device (10) to different inflation the levels. In use, a tire (14) is mounted between the mounts (38, 40), with the stop (18) having been preset on the standard (36); the tire (14) is then inflated to a desired level for inspection or diameter measurement purposes. The device (10) also has one or more pressure relief valve's (64, 66) in order to prevent dangerous overpressure conditions in the tire (14), as well as a dump valve (68) permitting the tire (14) to be rapidly deflated after the work thereon is completed. In practice, a tire (14) can be mounted on the device (10) and worked upon, in as little as about one minute.

14 Claims, 5 Drawing Sheets

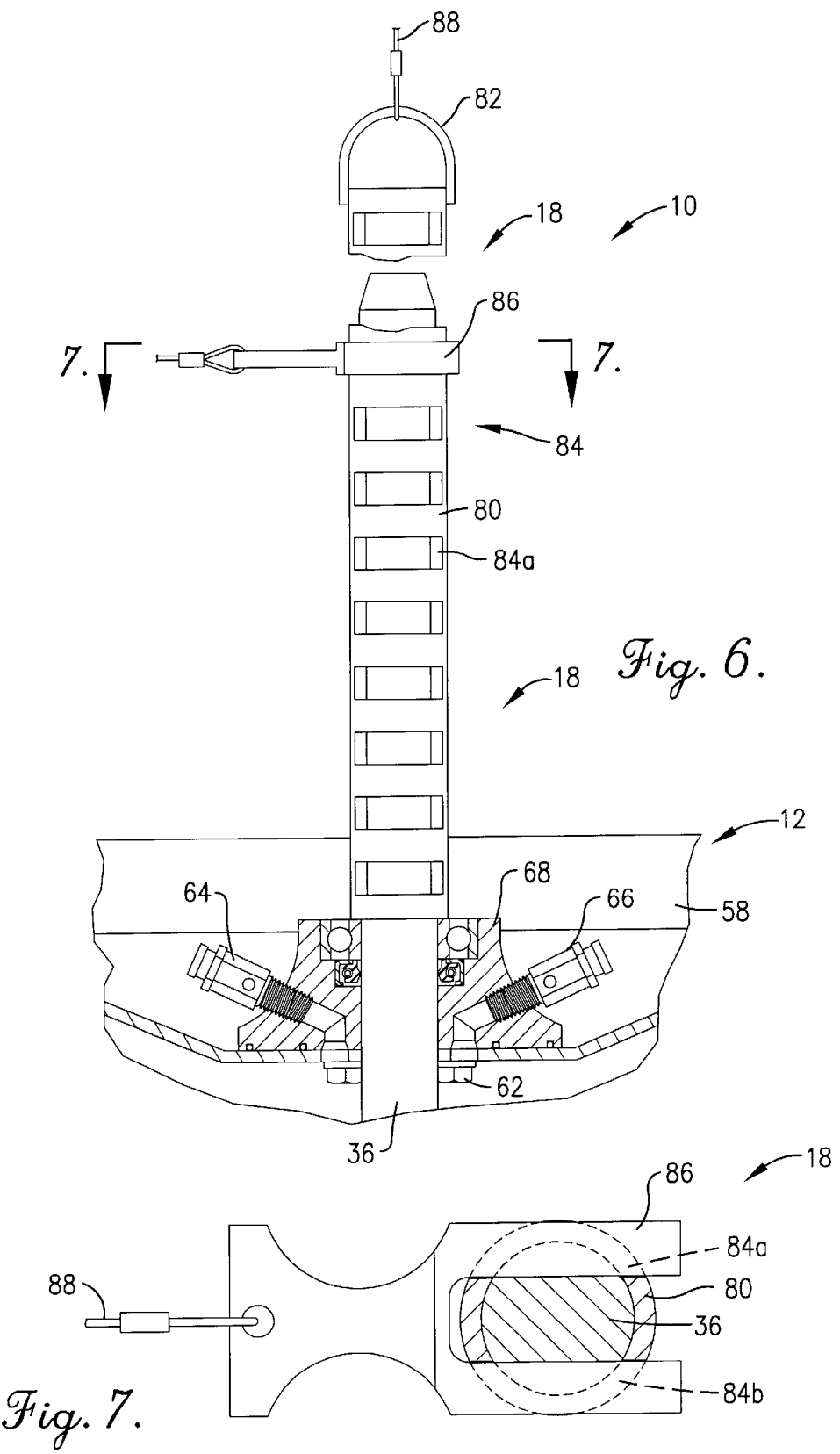

APPARATUS FOR MEASURING RACE CAR TIRE STAGGER

BACKGROUND OF THE INVENTION

1. Field of the Invention

The present invention is broadly concerned with a tire work device designed to permit ready mounting and inflation of rimless tires so as to permit rapid, accurate tire diameter measurement and/or tread inspection. More particularly, the invention is concerned with such a tire work device, and corresponding methods, wherein the device includes a tire support in the form of a pair of opposed, relatively movable tire mounts, with an inflator for inflating a tire mounted thereon and a stop associated with the tire support for limiting the expansion of a tire during inflation thereof.

2. Description of the Prior Art

The performance of racing automobiles on banked tracks is often improved by "staggering" the inside tires as compared with the outside tires. Thus, in some cases it is desirable to inflate the inside tires so that they have an effective diameter somewhat less (e.g., one inch) than the diameter of the outside tires. The tire stagger thus accommodates banked tracks, leading to higher race car speeds and better handling characteristics.

In the past, the methods used to achieve proper tire stagger have been both straight forward and crude, and generally comprised simply deflating the inside tires relative to the outside tires, so as to obtain a measure of stagger. Stagger gauges have been provided in the past, but these lack accuracy and can be difficult to use after a tire is mounted on an automobile. It will be appreciated though, that such ad hoc techniques do not lend themselves to accurate tire stagger. For example, there is no way to accurately determine whether the stagger between the front tires is the same as that for the rear tires. Moreover, given that tires are often changed during the course of a race, this being done as fast as possible to conserve time, there is no way to effectively maintain consistent tire stagger after such tire changes.

In addition to the problem of providing quick and accurate tire stagger determinations, high performance race car tires need to be carefully inspected, both when new and after use thereof. Such tires are expensive items, and many racing organizations reuse tires after a race for practice runs and the like. However, in order to assure that the tires are not damaged or otherwise unsafe, it is necessary to very closely inspect the tires for tread wear and separation, in related tire problems. In the past, such an inspection procedure has been somewhat tedious, owing to the lack of any effective mounting device which can be rapidly set up and used.

SUMMARY OF THE INVENTION

The present invention overcomes the problems outlined above and provides an improved tire work device for automotive tires, and especially high performance racing tires. Broadly speaking, the device of the invention includes a tire support comprising a pair of opposed tire mounts each adapted to engage a respective tire sidewall inner periphery for mounting of the tire between the supports; at least one of the mounts is movable relative to the other for altering the distance therebetween to thus allow the support to accommodate tires of different widths. An inflator is also provided for inflating a tire mounted on the tire support, as well as a stop associated with the support for preventing the separation of the tire mounts beyond a predetermined maximum, upon inflation of the mounted tire.

In preferred forms, the device includes an upright standard which supports the opposed tire mounts. The lower support is gravitationally located on the standard and is essentially fixed during use of the device. The upper support is slidably mounted on the standard and moves upwardly thereon during inflation of the tire. However, the preferred stop, which is in the form of a tubular body slid over the upper segment of the standard and serving as an abutment, limits the degree of upper movement of the upper mount during tire inflation. The stop is advantageously provided with a locking member allowing it to be positioned at any one of a number of locations on the standard, corresponding to different effective tire diameters (e.g., from 8 to 18 inches in diameter).

The standard is also preferably provided with an axial passageway extending from the lower end of the standard to a point between the upper and lower mounts. A pneumatic hose equipped with a foot-operated valve is coupled with the passageway to permit selective inflation of a mounted tire. In order to prevent any dangerous overpressure conditions, one or more relief valves are provided with the tire mounts; "glow in the dark" pressure gauges are also used so that the operator may know tire pressure at all times.

The lightweight design (about 20 pounds) of the tire work device permits it to be set up and taken down within about one minute. Moreover, during use a tire may be readily rotated during diameter measurements or inspections. A dump valve associated with the support also permits rapid deflation of a mounted tire to further speed use of the device.

BRIEF DESCRIPTION OF THE DRAWINGS

FIG. 6 is a vertical sectional view taken along line 6—6 of FIG. 5; and

FIG. 7 is a sectional view along line 7—7 of FIG. 6 and illustrating in detail the locking mechanism for the stop apparatus forming a part of the tire work device.

DETAILED DESCRIPTION OF THE PREFERRED EMBODIMENT

Figure 1:
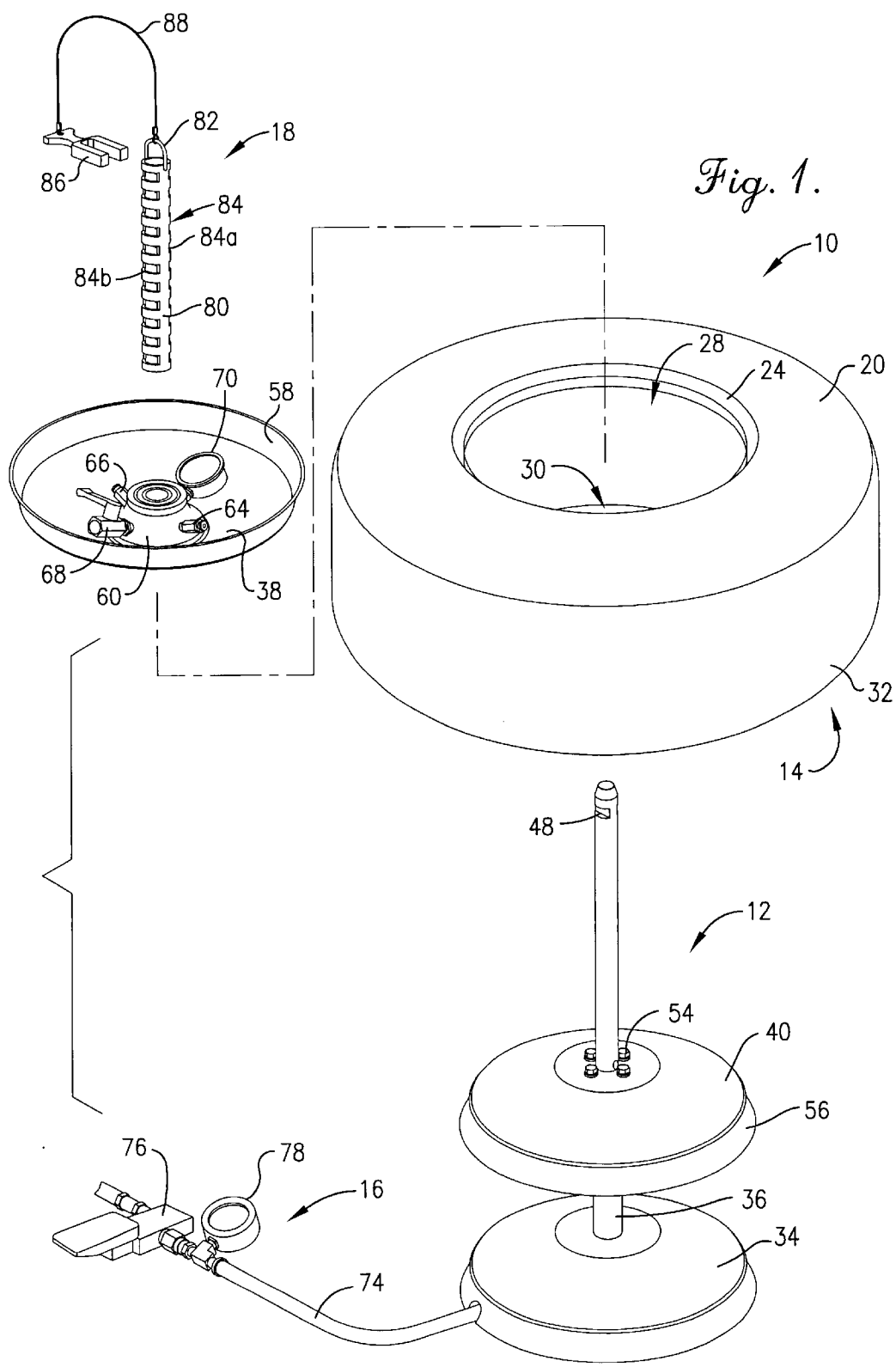
FIG. 1 is and exploded view of the preferred tire a work device of the invention, illustrating how the components of the device are assembled.
Figure 2:
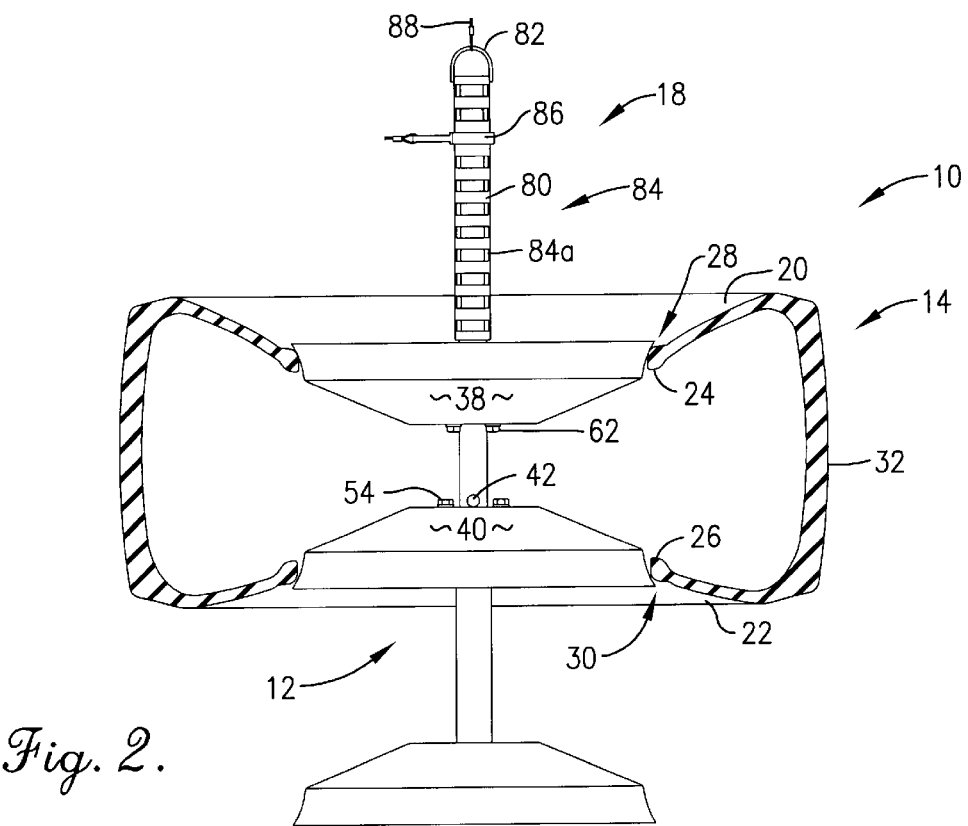
FIG. 2 is a vertical sectional view depicting a tire mounted and inflated on the device.
Figure 3:
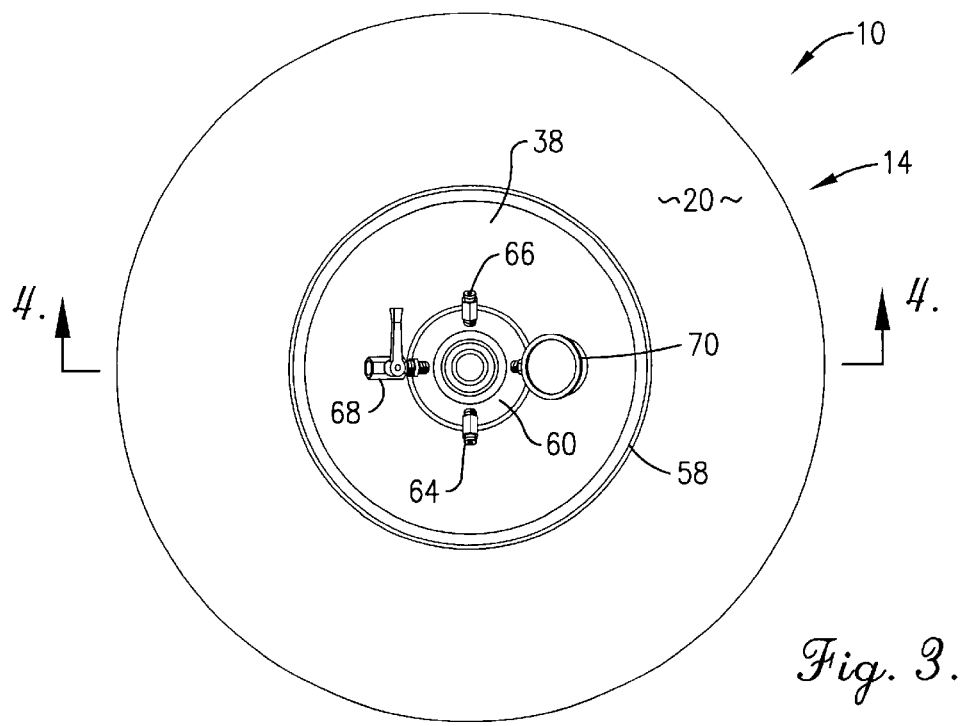
FIG. 3 is a plan view of the assembly illustrated in FIG. 3.

Turning now to the drawings, and particularly FIGS. 1—3, a tire or work device 10 broadly includes a tire support 12 adapted to mount a pneumatic automotive tire 14, and inflation and apparatus 16, and an adjustable stop 18. In this respect, it will be understood that the tire 14 is a essentially conventional design, including a pair of continuous sidewalls 20, 22 each having an inner periphery 24,26 which in turn defines a corresponding wheel-receiving central tire opening 28 and 30; a circumferentially extending, tread-bearing outer wall 32 extends between the outer margins of the sidewalls 20, 22 as shown.

Figure 4:
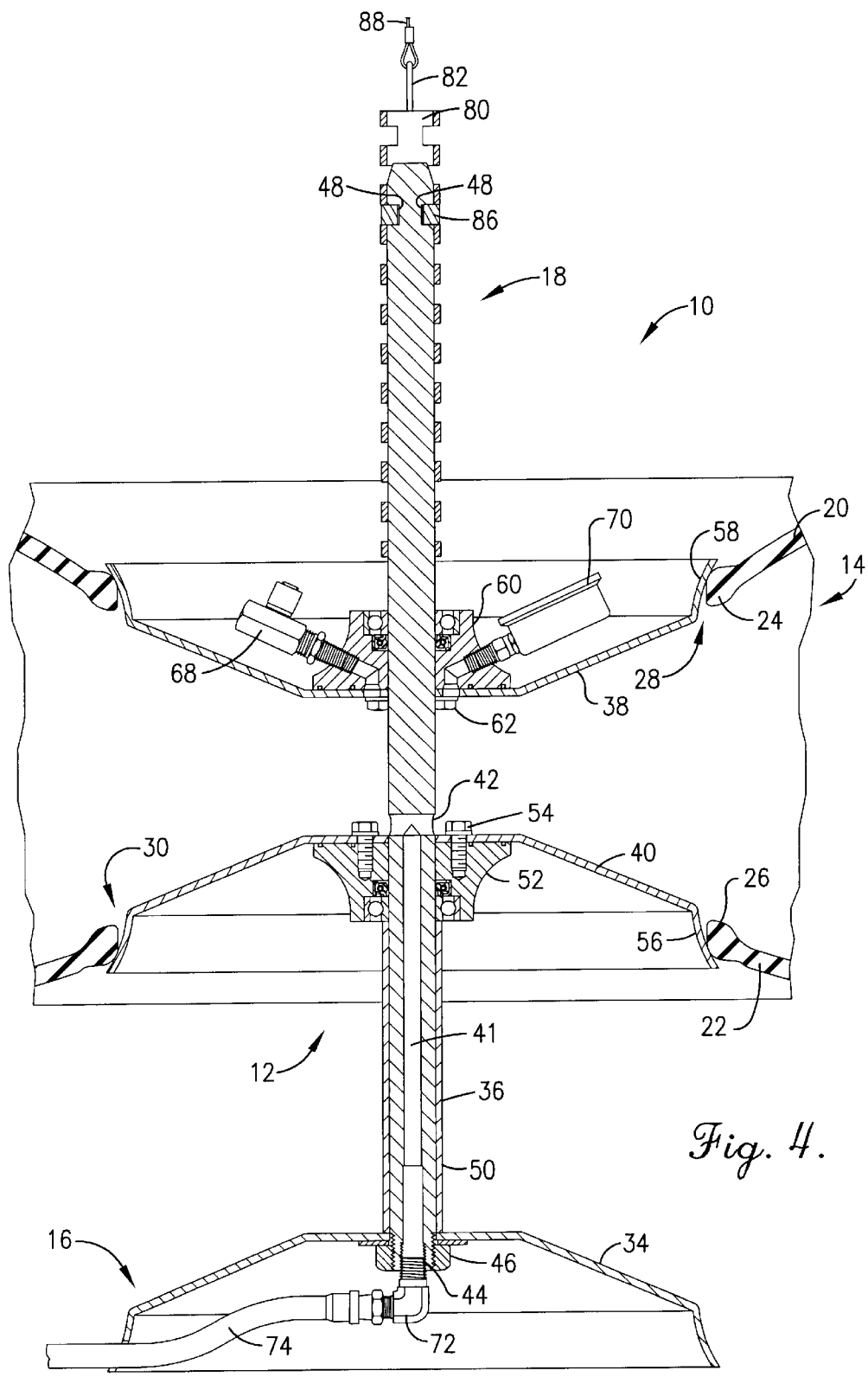
FIG. 4 is a fragmentary, enlarged, vertical sectional view of the preferred device with the tire mounted and thereon.
Figure 5:
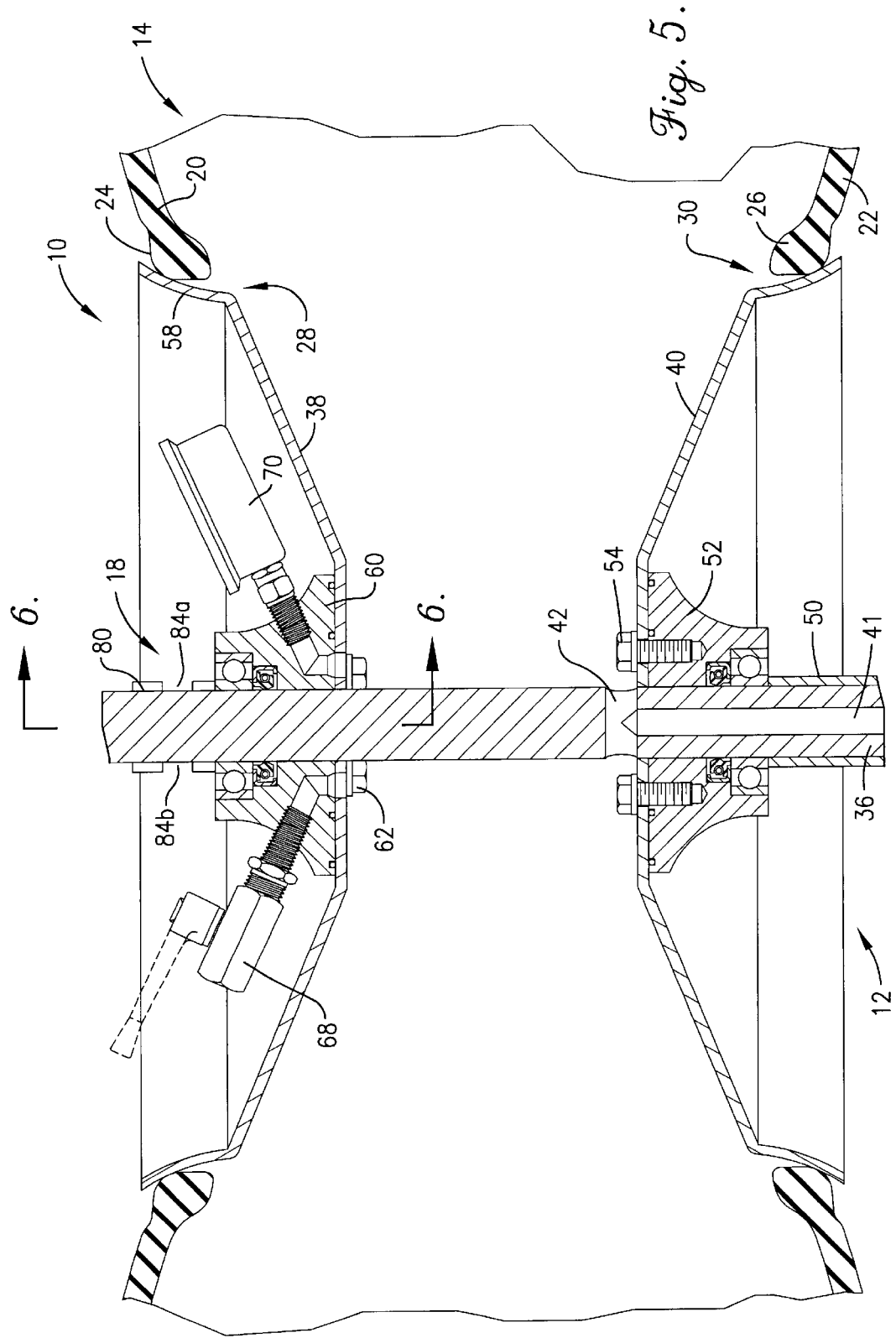
FIG. 5 is another fragmentary vertical sectional view illustrating in detail the construction of the tire work device.

In more detail, the tire support 12 includes a base 34 supporting a central, up standing standard 36, as well as a pair of circular, opposed, concave-convex upper and lower tire mounts 38 and 40. As shown, and the standard 36 is equipped with an elongated, axially extending passageway 41 leading from the base 34 upwardly to an outlet port 42 above the upper surface of lower tire mount 40; the lower end of the standard 36 includes an internally threaded inlet port 44. As best seen in FIG. 4, the standard 36 is secured to base 34 by means of a base nut 46. The upper segment of standard 36 above mount 40 presents a smooth, outer bearing surface which is important for purposes to be described. Further, and the uppermost end of the standard 36 has a pair of locking grooves 48 formed therein. Finally, the standard has a lower sleeve 50 surrounding the lower segment thereof, between the upper surface of base 34 and the underside of mount 40.

The lower mount 40 includes a circular bushing 52 secured to the underside thereof by screws 54. The lower surface of the bushing 52 abuts the upper surface of sleeve 50, so that the lower mount 40 gravitationally rests atop the sleeve 50. The outer periphery of the mount 40 includes an oblique wall 56 which is designed to engage the periphery 26 of tire 14.

The upper mount 38 is similar in configuration to the mount 40. Accordingly, it will be seen that the mount 38 has peripheral wall 58 for engagement with tire inner periphery 26, as well as a bushing 60 secured to the upper for face all of the mount via screws 62. In this case, however, the mount 38 is slidable on the standard 36 during use of device 10, as will be explained. In addition, the bushing 60 is provided with appropriate threaded openings therein for receipt of, respectively, a pair of pressure relief valves 64, 66, dump valve 68, and pressure gauge 70.

The inflation apparatus 16 includes a threaded elbow 72 received within inlet port 44 (FIG. 4), and a flexible pneumatic hose 74 coupled to the elbow 72. The hose 74 is adapted for connection with a source of pressurized air (not shown), and has a foot pedal-operated valve 76 interposed therein, together with a pressure gauge 78.

The adjustable stop 18 includes an elongated, tubular, slotted body 80 presenting a connection bail 82 at its upper and. The body 80 has a plurality of slot pairs 84 axially spaced along the length of thereof. Each slot pair 84 includes a pair of aligned slots 84a and 84b. Also, the stop 18 includes a forked connector 86 coupled to bail 82 by means of a flexible lanyard 88. The body 80 is positioned on the upper mount of standard 36 above mount 38, and is axially adjustable thereon in a manner to be described.

Device 10 as a variety of uses. One such use is in the measurement and adjustment of "tire stagger" in racing vehicles. Accordingly, the following is a description of how device 10 would be used in this context; however, it should be understood that other potential uses of the device 10 (such as in tire inspections) would proceed in much the same manner.

In initial setup of the device 10, the base and standard unit 34, 36 is placed at an appropriate location such as on a garage floor, and inflation apparatus 18 is coupled with a suitable source of pressurized air. Thereupon, the lower tire mount 40 is slid onto standard 36 and allowed to move downwardly until the base of bushing 52 abuts the upper surface of sleeve 50. Next, a selected tire 14 of known width is placed on the mount 40, with the periphery 26 adjacent mount wall 56. The upper mount 38 is then likewise slid downwardly upon the standard 36 until the mount wall 58 comes into adjacency with tire periphery 24.

At this point the stop 18 is positioned on standard 36 by sliding body 80 downwardly on the standard until an appropriate slot pair 84 comes into registry with the grooves 48 on the standard 36. When this occurs, the connector 86 is slid into place within both the slots 84a and 84b and the grooves 48, so as to thereby lock the body 80 in the desired position on standard 36. It will be understood in this respect that positioning of the body 80 on standard 36 is determined by the properly inflated width of the tire 14. Thus, for a tire of 15 in. Inflated width, the body 80 is positioned on standard 36 in a corresponding "15 in." position (for this purpose, the body 80 may be equipped with individual tire width markings to facilitate proper positioning of the body).

Next, the foot valve 76 is actuated so as to direct pressurized air through hose 74 and upwardly through passageway 41 so as to inflate tire 14. For this purpose, the user may observe gauges 70 and 78 to assure overpressuring of the tire is avoided. During the course of inflation of the tire 14, the tire expands and thereby moves upper mount 38 along the length of standard 36 until the upper surface of bushing 60 abuts the underside of stop body 80. Accordingly, by a proper positioning of the stop body 80 consistent with the width of the tire 14 being worked upon, and by monitoring of the pressure gauges, the tire 14 can be inflated until it assumes a road configuration. Of course, any potentially dangerous overpressure within tire 14 is eliminated by the provision of relief valves 64 and 66. For example, these valves may be set at 30 psig so that once tire inflation pressure reaches this level, no further inflation is possible.

After the tire is mounted and inflated on device 10, a measurement is taken of the diameter of the tire. The inflation pressure of the tire 14 is then adjusted upwardly and/or downwardly using the valve 76 to obtain different inflation pressures, and corresponding diameter measurements are then made. In this way the user can readily ascertain the diameter of the tire 14 at those different inflation pressures. The other tires on the racing vehicle are then similarly mounted and measured at different appropriate inflation levels. With this information, the user can then very accurately establish the degree of tire stagger needed for a particular racetrack or vehicle. Thus, if the "inside" tires for the vehicle need to have a diameter 1 in. less than the diameter of the "outside" tires, is only necessary to differentially inflate the "inside" and "outside" tires to achieve such a tire stagger.

I claim:

1. A tire work device for use with automotive tires having opposed, continuous sidewalls with inner peripheries defining corresponding, circular wheel-receiving openings, said device comprising:

a tire support comprising a pair of opposed tire mounts each adapted to engage a respective tire sidewall inner periphery for mounting of the tire between the tire supports, at least one of said mounts being movable relative to the other mount for altering the distance therebetween and allowing the support to accommodate tires of different widths;

an inflator for inflating a tire mounted on said tire support, said at least one mount being movable relative to the other mount during such inflation; and a stop associated with said tire support for preventing the separation of said tire mounts beyond a predetermined maximum, upon inflation of said tire.

2. The device of claim 1, each of said mounts including a central opening therethrough, said mounts being positioned on an elongated standard.

3. The device of claim 2, said one mount being slidable on said standard, said other mount being positioned on the standard at a selected location during use of the device.

4. The device of claim 2, said stop comprising an abutment member mounted on said standard adjacent said one mount and engageable with the one mount upon inflation of said tire.

5. The device of claim 4, said abutment member being adjustably positionable at a number of different locations on said standard.

6. The device of claim 2, said inflator comprising a passageway in said standard and terminating between said mounts, and apparatus operably coupled with said passageway for directing pressurized air into said passageway for inflating said tire.

7. The device of claim 1, including a pressure relief valve associated with said tire support for preventing inflation of said tire beyond a predetermined maximum pressure.

8. The device of claim 1, said stop being adjustable to allow separation of said tire mounts to different predetermined maximums.

9. The device of claim 1, including a pressure gauge operably coupled with said support for indicating the inflation pressure of said tire.

10. The device of claim 1, including a selectively operable dump valve operably coupled with said support for allowing selective deflation of said tire on said support.

11. A method of tire work comprising the steps of:

providing a tire having opposed, continuous sidewalls having inner peripheries defining corresponding circular wheel-receiving openings;

mounting said tire between a pair of opposed tire mounts, with each mount engaging a respective tire sidewall inner periphery;

inflating said mounted tire, and thereby causing at least one of said tire mounts to move relative to the other tire mount; and stopping the movement of said at least one tire mount and preventing separation of the tire mounts beyond a predetermined maximum distance.

12. The method of claim 11, including the step of inflating said tire only to a predetermined maximum pressure.

13. The method of claim 11, including the step of measuring the diameter of the tire after inflation thereof.

14. The method of claim 11, said tire supports mounted on an elongated standard, said inflation step comprising the step of directing pressurized air through said standard and between said tire mounts, in order to inflate said tire.

* * * * *